United States Patent [19]

Okamoto et al.

[11] Patent Number: 5,401,559
[45] Date of Patent: Mar. 28, 1995

[54] BIAXIALLY ORIENTED THERMOPLASTIC RESIN FILM

[75] Inventors: Katsuya Okamoto, Hirakata; Koichi Abe, Kyoto; Syoji Nakajima, Otsu, all of Japan

[73] Assignee: Toray Industries, Inc., Japan

[21] Appl. No.: 978,089

[22] Filed: Nov. 17, 1992

[30] Foreign Application Priority Data

Nov. 18, 1991 [JP] Japan .................................. 3-301784

[51] Int. Cl.$^6$ .......................... B32B 5/22; B32B 27/36
[52] U.S. Cl. ................................. 428/143; 428/147; 428/327; 428/480; 428/910
[58] Field of Search ............. 428/323, 329, 910, 480, 428/141, 143, 147, 327

[56] References Cited

U.S. PATENT DOCUMENTS

| | | | |
|---|---|---|---|
| 4,670,319 | 6/1987 | Katoh et al. | 428/141 |
| 4,734,325 | 3/1988 | Ryoke et al. | 428/323 |
| 4,746,703 | 5/1988 | Dallmann et al. | 525/176 |
| 4,761,327 | 8/1988 | Hamano et al. | 428/220 |
| 4,767,657 | 8/1988 | Sakamoto et al. | 428/143 |
| 4,780,365 | 10/1988 | Kakuishi et al. | 428/323 |
| 4,781,963 | 11/1988 | Utsumi et al. | 428/141 |
| 4,797,321 | 1/1989 | Funahashi et al. | 428/328 |
| 5,006,589 | 4/1991 | Sakamoto et al. | 524/430 |
| 5,047,278 | 9/1991 | Ono et al. | 428/141 |
| 5,057,364 | 10/1991 | Saito et al. | 428/323 |
| 5,069,962 | 12/1991 | Okazaki et al. | 428/323 |
| 5,100,719 | 3/1992 | Endo et al. | 428/213 |
| 5,164,439 | 11/1992 | Sakamoto | 524/425 |
| 5,208,091 | 5/1993 | Yanagata et al. | 428/141 |

FOREIGN PATENT DOCUMENTS

| | | |
|---|---|---|
| 59-171623 | 9/1984 | Japan . |
| 2-77431 | 3/1990 | Japan . |
| 3-150127 | 6/1991 | Japan . |

*Primary Examiner*—Paul J. Thibodeau
*Assistant Examiner*—Vivian Chen
*Attorney, Agent, or Firm*—Austin R. Miller

[57] ABSTRACT

Disclosed is a biaxially oriented thermoplastic resin film formed by laminating a layer A composed of a thermoplastic resin A containing particles on at least one surface of a layer B composed of a thermoplastic resin B. The film has a specified ratio t/d of the thickness of the layer A "t" to the mean diameter of the particles contained in the thermoplastic resin A "d", a specified number of protrusions having a diameter of not less than 0.7 μm and not more than 2.6 μm among protrusions existing on the surface of the layer A and a specified ratio L/S of a number S of protrusions having a smaller diameter to the number L of protrusions having a diameter in the above range. An excellent winding property when the film is wound and an excellent dubbing resistance when the film is used for a video tape can be obtained.

13 Claims, No Drawings

BIAXIALLY ORIENTED THERMOPLASTIC RESIN FILM

BACKGROUND OF THE INVENTION

1. Field of the Invention

The present invention relates to a biaxially oriented thermoplastic resin film, and more particularly to a biaxially oriented thermoplastic resin film suitable for the base film of a magnetic recording media such as a video tape.

2. Description of the Prior Art

The surface of a biaxially oriented thermoplastic resin film used for a magnetic recording media such as a video tape has been required to be flatter in order to obtain a higher output property of the tape. As a biaxially oriented thermoplastic resin film used for a magnetic recording media, a film wherein spherical silica particles are contained in polyester is known and described in, for example, JP-A-SHO 59-171623.

In such a conventional biaxially oriented thermoplastic resin film, however, there is a problem that lengthwise wrinkles and/or telescoping are likely to occur when the film is produced, slitted or processed into a video tape, when the surface of the film is formed to be flatter in order to satisfy the above requirement. On the other hand, when the surface of the film is formed roughly, the signal/noise ratio (S/N) when the film is processed into a video tape is not good and it is difficult to obtain a sufficiently high-quality image when the original video tape formed from the film is dubbed.

As a film solving the above problem, a biaxially oriented thermoplastic resin film, wherein protrusions with a relatively uniform height are formed on at least one surface of the film at a high density in order to achieve good handling ability and running ability and in order to suppress the deterioration of the image quality when the tape is dubbed, is known and described in, for example, JP-A-HEI 2-77431.

Further, a biaxially oriented thermoplastic resin film, wherein protrusions are formed on the film surface by using at least two kinds of particles having mean diameters different from each other in order to achieve the above properties as well as improve the scratch resistance, is known and described in, for example, JP-A-HEI 3-150127.

However, even in such conventional films, it is difficult to prevent a defect of roll formation in the film winding process and to increase the yield for film production or film processing thereby reducing the production or processing cost.

SUMMARY OF THE INVENTION

An object of the present invention is to provide a biaxially oriented thermoplastic resin film capable of preventing lengthwise wrinkles and/or telescoping particularly when the film is wound at a high speed (hereinafter, referred to as "excel in winding property") and capable of obtaining a high-quality image when the film is used as the base film of a magnetic recording media and the image recorded in the magnetic recording media is dubbed (hereinafter, referred to as "excel in dubbing resistance").

To accomplish this object and other objects, a biaxially oriented thermoplastic resin film according to the present invention is formed by laminating a layer A composed of a thermoplastic resin A containing particles on at least one surface of a layer B composed of a thermoplastic resin B and is characterized in that a ratio t/d of a thickness of the layer A "t" to a mean diameter of the particles contained in the thermoplastic resin A "d" is in the range of 0.1 to 5, a number of protrusions having a diameter of not less than 0.7 μm and not more than 2.6 μm among protrusions existing on the surface of the layer A is in the range of 100/mm$^2$ to 10,000/mm$^2$ and a ratio L/S of a number S of protrusions having a diameter of not less than 0.2 μm and less than 0.7 μm to the number L of protrusions having a diameter of not less than 0.7 μm and not more than 2.6 μm is in the range of 1/50 to 1/10,000.

Another biaxially oriented thermoplastic resin film according to the present invention is formed by laminating a layer A composed of a thermoplastic resin A containing at least two kinds of particles having mean diameters different from each other on at least one surface of a layer B composed of a thermoplastic resin B and is characterized in that a ratio t/d of a thickness of the layer A "t" to a mean diameter of the particles contained in the thermoplastic resin A "d" is in the range of 0.1 to 5, a number of protrusions having a diameter of not less than 0.7 μm and not more than 2.6 μm among protrusions existing on the surface of the layer A is in the range of 100/mm$^2$ to 10,000/mm$^2$ and a ratio Pw/Qw of a weight content Pw of particles having the smallest mean diameter among the at least two kinds of particles contained in the thermoplastic resin A to a weight content Qw of particles having the largest mean diameter among the at least two kinds of particles contained in the thermoplastic resin A is in the range of 4 to 400.

In the former biaxially oriented thermoplastic resin film according to the present invention, the protrusions having a larger mean diameter exist at relatively large intervals on the film surface on which a number of protrusions having a smaller mean diameter are formed. The protrusions with the smaller mean diameter maintain the film surface to be in a desired roughness and thereby achieve good abrasion resistance and running ability and a high-quality image when the film is processed into a magnetic recording media. The fewer protrusions having a larger mean diameter prevent slipping between the film surfaces and prevent telescoping even if the film is wound at a high speed as well as prevent wrinkles from occurring by forming air escaping paths between the larger protrusions. Therefore, a film having excellent winding property and dubbing resistance can be obtained.

In the latter biaxially oriented thermoplastic resin film according to the present invention, at least two kinds of particles having mean diameters different from each other are concentrated in the layer A, and the relationship between the thickness of the layer A and the mean diameter of the particles and the ratio of the weight contents of the particles having the smallest mean diameter and the particles having the largest mean diameter are controlled within the specified ranges, respectively. The larger particles form larger protrusions and the smaller particles form smaller protrusions on the film surface. Similarly to the former film, the larger protrusions exist at relatively large intervals on the film surface on which a number of the smaller protrusions are formed. The smaller protrusions maintain the film surface to be in a desired roughness and thereby achieve good abrasion resistance and running ability and a high-quality image when the film is processed into a magnetic recording media. The fewer protrusions with larger sizes prevent slipping between the film surfaces and prevent telescoping even if the film is wound at a high speed as well as prevent wrinkles from occurring by forming air escaping paths between the larger protrusions. Therefore, a film having excellent winding property and dubbing resistance can be obtained.

DETAILED DESCRIPTION OF THE PREFERRED EMBODIMENTS OF THE INVENTION

Next, the present invention will be explained in more detail by embodiments and examples. However, the present invention is not restricted by the embodiments and examples.

Although the thermoplastic resin A of the biaxially oriented thermoplastic resin film according to the present invention is not particularly restricted, for example, polyester, polyolefine, polyamide or polyphenylene sulfide can be employed. Particularly, polyester is preferable as the thermoplastic resin A. Among polyesters, a polyester containing at least one of ethylene terephthalate, ethylene $\alpha$, $\beta$-bis(2-chlorophenoxy)ethane-4,4'-dicarboxylate and ethylene 2,6-naphthalate as its main constituent is particularly preferable, because the winding property and the dubbing resistance obtained can be further improved.

Further, the thermoplastic resin employed in the present invention is preferably a crystalline resin or a resin with an optical anisotropy in a melting state in order to further improve the winding property and the dubbing resistance of the film. The term "crystalline" means "not amorphous". The cold crystallization temperature Tcc of the resin is quantitatively determined and the crystallization parameter $\Delta$Tcg, which is the difference between the cold crystallization temperature Tcc and the glass transition temperature Tg, is not greater than 150° C. Further, the crystallinity of the resin is preferably at a level represented by the heat of melting of the resin determined by a differential scanning calorimeter (variation of melting enthalpy) of not less than 7.5 cal/g in order to get particularly excellent winding property and dubbing resistance. In the thermoplastic resin A, two or more kinds of thermoplastic resins may be blended and a copolymerized polymer may be used, unless the advantages according to the present invention are damaged.

In the present invention, at least two kinds of particles P (particles having the smallest mean diameter) and particles Q (particles having the largest mean diameter) are preferably contained in the thermoplastic resin A. However, the kinds of the particles are preferably not more than five kinds in order to maintain a good winding property. As the particles P satisfying the above condition, alumina silicate, agglomerated silica particles and non-incorporated particles are not preferred. The particles are preferably substantially spherical silica particles originating from colloidal silica or crosslinked organic particles in order to further improve the winding property and the dubbing resistance of the film. However, other particles such as calcium carbonate, titanium dioxide and alumina particles may also be employed by controlling the mean diameter thereof relative to the thickness of the film. The particles Q are preferably crosslinked organic particles in order to further improve the winding property and the dubbing resistance of the film. As the crosslinked organic particles, for example, crosslinked polydivinylbenzene particles, crosslinked polystyrene particles, crosslinked polyester particles, crosslinked polyimide particles or crosslinked polyethersulfone particles can be employed. Further, the surfaces of the crosslinked organic particles are preferably covered by a polymer having a functional group represented by a chemical formula —COOX ("X" is "H", an alkyl group, an alkali metal or an alkaline earth metal) such as polyacrylic acid, sodium polyacrylic acid or sodium polymethacrylic acid in order to obtain better winding property and dubbing resistance. If the particles are covered by a copolymer or a blend of the polymer represented by the chemical formula —COOX with other polymer, the winding property and dubbing resistance can be further improved. Furthermore, the particles are preferred substantially not to react with the thermoplastic resin A and the polymer covering the particles. The "particles substantially not reacting" means particles which do not chemically react with the covering polymer and the thermoplastic resin A and which do not have a chemical bond such as a covalent bond and an ionic bond therewith. When the particles do not strongly react with the covering polymer and/or the thermoplastic resin A, the aggregation of the particles in the thermoplastic resin A does not occur and the winding property and dubbing resistance can be further improved. Particularly, if a dispersant is added together with the particles, the aggregation of the particles can be prevented and further better winding property and dubbing resistance can be obtained.

In the present invention, the ratio t/d of the thickness "t" of the layer A composed of the thermoplastic resin A to the mean diameter "d" of the particles contained in the thermoplastic resin A is in the range of 0.1 to 5, preferably in the range of 0.2 to 2.5, and more preferably in the range of 0.3 to 1.0. If the ratio t/d is less than the above range, the winding property deteriorates, and if the ratio t/d is more than the above range, the dubbing resistance deteriorates.

Although the mean diameter "d" of the particles contained in the thermoplastic resin A is not particularly restricted, the mean diameter is preferably in the range of 0.02 to 1.0 $\mu$m, more preferably in the range of 0.05 to 0.8 $\mu$m in order to further improve the winding property and dubbing resistance.

Although the shape of the particles contained in the thermoplastic resin A is not particularly restricted, the particle size ratio of the particles in the film (the ratio of average longer diameter/average shorter diameter of the particles) is preferably in the range of 1.0 to 1.3, particularly spherical particles are preferable, in order to further improve the winding property and dubbing resistance of the film.

The content of the particles contained in the thermoplastic resin A is preferably in the range of 0.2 to 15 wt% relative to the total weight of the layer A, more preferably in the range of 0.5 to 10 wt%, and further more preferably in the range of 1 to 8 wt%. The ratio Pw/Qw of the weight content Pw of particles having the smallest mean diameter among the particles contained in the thermoplastic resin A to the weight content Qw of particles having the largest mean diameter among the particles contained in the thermoplastic resin A is in the range of 4 to 400, preferably in the range of 6 to 250, to obtain better winding property and dubbing resistance of the film.

Although the main constituents of the layer A according to the present invention are the thermoplastic resin A and at least two kinds of particles having diameters different from each other, other polymers may be blended as long as the objects of the present invention are not injured. Further, a generally used organic additive, for example, oxidation inhibitor, thermal stabilizer, lubricant, ultraviolet absorbent etc., may be added by the volume usually employed.

The film according to the present invention is a film made by biaxially orientating the above composition. A uniaxially oriented or non-oriented film is not desirable because a good winding property cannot be obtained. Although the degree of the orientation is not particularly restricted, the Young's modulus, which can be an index representing the degree of the orientation, is preferred to be not less than 350 kg/mm$^2$ in both of the longitudinal and transverse directions in order to further improve the winding property. Although the upper limit of the Young's modulus, which can be an index representing the degree of the orientation, is not particularly restricted, usually about 1,500 kg/mm$^2$ is the limit from the viewpoint of production.

Further, even if the Young's modulus is in the above range, it is particularly preferred that the molecular orientation of a part of the film in the thickness direction, for example, a portion near the surface, is not non-oriented or uniaxially oriented, namely, the molecular orientation of the whole of the film in the thickness direction is biaxially oriented in order to obtain a better winding property and dubbing resistance of the film. Particularly, when the molecular orientation measured by an Abbe refractometer or a refractometer using a laser or determined by total reflection Raman spectroscopic analysis is determined to be biaxially oriented at both the surface and the back surface, further better winding property and dubbing resistance can be obtained.

The thermoplastic resin A is preferably a crystalline polyester, and the total reflection Raman crystallization index of the surface is preferably not more than 20 cm$^{-1}$, more preferably not more than 18 cm$^{-1}$, and further more preferably not more than 17 cm$^{-1}$ in order to obtain better winding property and dubbing resistance of the film.

The thickness of the film composed of the thermoplastic resin A is preferably in the range of 0.01 to 3 μm, particularly in the range of 0.05 to 1 μm, in order to obtain a better winding property and dubbing resistance of the film.

The mean height of the protrusions on the surface of the layer A composed of the thermoplastic resin A is preferably in the range of 10 to 800nm, and more preferably in the range of 20 to 500nm, in order to obtain better winding property and dubbing resistance of the film.

In the present invention, the number of the protrusions on the surface of the layer A composed of the thermoplastic resin A, which has a diameter of not less than 0.7 μm and not more than 2.6 μm, is in the range of 100/mm$^2$ to 10,000/mm$^2$, preferably in the range of 300/mm$^2$ to 9,000/mm$^2$, and more preferably in the range of 500/mm$^2$ to 8,000/mm$^2$. If the number of the protrusions with a diameter of 0.7 μm to 2.6 μm is less than the above range, the winding property deteriorates, and if the number of the protrusions is more than the above range, the dubbing resistance deteriorates.

The ratio L/S of a number S of the protrusions having a diameter of not less than 0.2 μm and less than 0.7 μm to the number of the protrusions with a diameter of 0.7 μm to 2.6 μm is in the range of 1/50 to 1/10,000, preferably in the range of 1/70 to 1/5,000, and more preferably in the range of 1/100 to 1/3,000, in order to obtain better winding property and dubbing resistance of the film.

The total number of the protrusions on the surface of the layer A composed of the thermoplastic resin A is preferably in the range of 100,000/mm$^2$ to 2,000,000/mm$^2$, more preferably in the range of 150,000/mm$^2$ to 900,000/mm$^2$, and further more preferably in the range of 200,000/mm$^2$ to 800,000/mm$^2$, in order to obtain better winding property and dubbing resistance of the film.

As aforementioned, the thermoplastic resin constituting the film according to the present invention is preferred to be a crystalline resin or a resin with an optical anisotropy in a melting state. In the case where the film is isotropic in a melting state, the crystallization parameter "ΔTcg" is preferably in the range of 25° C. to 65° C. to obtain a better winding property.

In a case where the thermoplastic resin A is polyester, the refractive index at the surface of the thermoplastic resin layer A in the thickness direction is preferably not more than 1.5 to obtain better winding property and dubbing resistance of the film. Further, the intrinsic viscosity of the film is preferably not less than 0.60, particularly not less than 0.70, to further improve the winding property.

The thermoplastic resin B is preferably a crystalline resin. Particularly, when the crystallization parameter "ΔTcg" of the thermoplastic resin B is in the range of 20°-100° C. to further improve the winding property. As concrete examples of such a resin, polyester, polyamide, polyphenylene sulfide and polyolefine are raised. Among these resins, polyester is preferable because a better winding property can be obtained. Among polyesters, a polyester containing at least one unit selected from the group consisting of ethylene terephthalate, ethylene α, β-bis(2-chlorophenoxy)ethane-4,4'-dicarboxylate and ethylene 2,6-naphthalate as its main constituent is preferable to further improve the dubbing resistance. However, other components may be copolymerized as long as the content of the other components is within 5mol%, unless the advantages according to the present invention are damaged. Further, the kind of the thermoplastic resin B may be the same as that of the thermoplastic resin A or different therefrom.

Further, other polymers may be blended with the thermoplastic resin B as long as the objects of the present invention are not injured, and a generally used additive, for example, oxidation inhibitor, thermal stabilizer, lubricant, ultraviolet absorbent etc., may be added by the volume which is usually employed.

Although it is not necessary that particles are contained in the film layer B of the thermoplastic resin B, it is preferred that particles having a mean diameter of 0.01-1 μm, more preferably 0.03-0.5 μm, are contained at a content of 0.001-0.8 wt%, preferably 0.005-0.6 wt%, because the winding property is further improved. The kind of the contained particles is preferably the same as that of the particles contained in the layer A composed of the thermoplastic resin A. The respective particles contained in the thermoplastic resins A and B may be the same or may be different from each other.

Although the difference (A–B) between the crystallization parameters "ΔTcg" of the thermoplastic resins A and B is not particularly restricted, preferably it is in the range of −30° C. to +20° C. to further improve the winding property and dubbing resistance of the film.

Next, a process for producing the biaxially oriented thermoplastic resin film according to the present invention will be explained. However, the process is not particularly restricted by the following one.

As the method for containing particles in the thermoplastic resin, in a case where the resin is polyester, a method for dispersing the particles in ethylene glycol, which is the diol component of the polyester, in the form of a slurry, and thereafter copolymerizing the ethylene glycol with a dicarboxylic acid component, is effective to obtain a film satisfying the relationship between the thickness of the layer A composed of the thermoplastic resin A and the mean diameter of the particles contained in the resin which is specified in the present invention. Further, a method for controlling the crystallization parameters "ΔTcg" of the polyester within the range of 40 to 65° C. by controlling the melt viscosity and copolymerization components is effective to obtain a film satisfying the relationship between the thickness of the layer A composed of the thermoplastic resin A and the mean diameter of the particles contained in the resin which is specified in the present invention. Furthermore, a method for heat treating the slurry of ethylene glycol containing the particles at a temperature of 140 to 200° C., particularly at a temperature of 180 to 200° C., for a time of 30 minutes to 5 hours, preferably for a time of 1 to 3 hours, is effective to obtain a film satisfying the relationship between the thickness of the layer A composed of the thermoplastic resin A and the mean diameter of the particles contained in the resin which is specified in the present invention.

As another method for containing particles in the thermoplastic resin, a method for, after heat treating the particles in ethylene glycol, mixing the particles at a state of a slurry, wherein the solvent is substituted by water, with the thermoplastic resin, and blending the particles into the thermoplastic resin by using a vent type twin screw extruder, is particularly effective to obtain a film satisfying the relationship between the thickness of the layer A composed of the thermoplastic resin A and the mean diameter of the particles contained in the resin which is specified in the present invention.

As the method for controlling the content of the particles, a method for preparing master pellets having a high concentration by the above method and diluting the master pellets with the thermoplastic resin which substantially does not contain particles when the film is produced is effective. As the method for containing at least two kinds of particles in the thermoplastic resin, a method for dispersing at least the two kinds of particles in a state of a slurry of the diol component and thereafter copolymerizing this with a dicarboxylic acid component as described above, or a method for preparing the respective high-concentration master polymers containing the respective particles and controlling the respective contents of the respective particles when the film is produced as described above, can be both employed.

The pellets thus prepared and containing at least two kinds of particles are dried as needed. Next, as the method for laminating the film layer A composed of the thermoplastic resin A on the film layer B composed of the thermoplastic resin B, the following one is effective.

The thermoplastic resins A and B are supplied to known extruders, the molten polymers are delivered out from a die in the form of a sheet, and the sheet is cooled and solidified on a casting roll to form a non-stretched film. Namely, the lamination of the thermoplastic resins A and B is carried out by using two or more extruders and a die having a composite manifold or a feed block for three or more layers, a molten sheet having three or more layers is delivered out from a die, the delivered sheet is cooled on a casting roll to form a non-stretched film. In such a manner, it is effective to install a static mixer and a gear pump in the polymer path in order to obtain a film satisfying the relationship between the thickness of the layer A composed of the thermoplastic resin A and the mean diameter of the particles contained in the resin which is specified in the present invention.

Next, the non-stretched film obtained is biaxially stretched and biaxially oriented. As the stretching process, a sequential biaxial stretching or a simultaneous biaxial stretching can be employed. Especially, a process for using a sequential biaxial stretching, wherein firstly longitudinal stretching and secondly transverse stretching are carried out, is preferred, and a process for dividing the longitudinal stretching into three or more stages and setting the total draw ratio of the longitudinal stretching to 3.0 to 6.5 times is particularly effective to obtain a film satisfying the relationship between the thickness of the layer A composed of the thermoplastic resin A and the mean diameter of the particles contained in the resin which is specified in the present invention. However, in a case where the thermoplastic resin is a resin with an optical anisotropy in a melting state, the draw ratio of the longitudinal stretching is preferably in the range of 1.0 to 1.1 times. Although it is difficult to determine the optimum temperature for the longitudinal stretching to a particular temperature because the optimum temperature varies depending on the kind of the thermoplastic resin, usually setting the temperature of the first stage to 50 to 130° C. and the temperatures of other stages after the first stage to a higher temperature is effective to obtain a film satisfying the relationship between the thickness of the layer A and the mean diameter of the particles contained in the resin which is specified in the present invention. The stretching rate in the longitudinal direction is preferably in the range of 5,000 to 50,000%/min. The transverse stretching is usually conducted by using a stenter. The stretching rate in the transverse direction is preferably in the range of 1,000 to 20,000%/min, and the temperature for the stretching is preferably in the range of 80 to 160° C.. The biaxially stretched film thus formed is then heat treated. The temperature of the heat treatment is preferably in the range of 150 to 220° C., more preferably in the range of 170 to 210° C., and the time of the heat treatment is preferably in the range of 0.5 to 60 seconds.

Next, methods for determining the characteristics in the present invention and estimating the effects according to the present invention will be explained.

(1) Mean diameter of particles

The thermoplastic resin is removed from the film by plasma low temperature ashing treatment to expose the particles. The condition of the ashing treatment is selected such that the particles are not damaged whereas the polymer is ashed. The exposed particles are observed by a scanning electron microscope by the number of not less than 5,000 and the image of the particles is processed by an image analyzer. The mean diameter of particles is determined by the following equation with respect to a peak of the distribution curve of the particle diameter and a clearly narrow specified range of the curve.

Further, in a case where the determination is difficult by the above method, the film is cut in the thickness direction of the film at a very thin sample having a thickness of 1,000 to 8,000 Å, and the cut sample is observed at a magnification of 1,000 to 200,000 times by using a transmission type electron microscope (for example, JEM-1200EX produced by Nippon Denshi Corporation), and the mean diameter of particles is determined by the following equation. The average number diameter is defined as the mean diameter of particles.

$$D = \Sigma Di/N$$

Where, Di is a circle equivalent diameter of particle, and N is the number of the particles.

(2) Particle diameter ratio

The particle diameter ratio is defined as the ratio of the mean value of the long diameters and the mean value of the short diameters of the particles measured in the above item (1). The respective mean values are determined by the following equations.

$$\text{long diameter} = \Sigma D1i/N$$

$$\text{short diameter} = \Sigma D2i/N$$

Where, D1i and D2i represent the long diameter (maximum diameter) and the short diameter (minimum diameter) of the respective particles, and N represents total number of the determined particles.

(3) Content of particles

The film is treated with a solvent which dissolves the thermoplastic resin but which does not dissolve the particles, and the particles are separated from the thermoplastic resin by centrifugation. The content of the particles is defined as the ratio of the weight of the separated particles to the total weight of the film (% by weight). Alternatively, as needed, the determination may be carried out by utilizing infrared spectrophotometry.

(4) Thickness of thermoplastic resin layer A

The ratio of the density of the element originating from the particles contained at the highest density in the film to the density of the carbon in the polyester (M+/C+) determined by using secondary ion mass spectrum (SIMS) within the range of a depth of 3000nm from the film surface is defined as the particle density, and the analysis is carried out along the thickness direction of the film down to the depth of 3000nm. The particle density in the outermost layer increases as distanced from the surface because the surface constitutes a boundary surface.

In the film according to the present invention, the particle density becomes the maximum at a depth and thereafter decreases again. Based on this particle density curve, a depth, at which the particle density becomes half of the maximum value, is defined as the thickness of the laminated layer (this depth is greater than the depth causing the maximum particle density).

The measuring conditions are as follows. ① Measuring apparatus:

Secondary ion mass spectrum analysis apparatus (SIMS);
A-DIDA3000 produced by ATOMIKA (Germany)
② Measuring conditions:
Primary ion species; $O_2^+$
Primary ion acceleration voltage; 12KV
Primary ionic current; 200nA
Raster area; 400 μm □
Analysis area; gate 30%
Degree of vacuum for measurement; $5.0 \times 10^{-9}$ Torr
E-GUN; 0.5KV–3.0KV In a case where the particles contained at the highest density within the range of 3000nm from the film surface are crosslinked organic particles, because the determination by SIMS is difficult, the thickness of the laminated layer may be determined by measuring the depth profile of the particle density by X-ray photoelectron spectrum (XPS) or infrared spectroscopic analysis (IR) while etching from the surface, and determining in a manner similar to the above-described manner. Further, the thickness may be determined by observing the cross section of the film with a electron microscope and recognizing the boundary of the layer from the variation state of the particle density and/or the difference of the contrasts.

(5) Crystallization parameter ΔTcg, Heat of fusion

The measurement is performed by using a differential scanning calorimeter. The measuring conditions are as follows.

Ten milligrams of a sample are placed in the differential scanning calorimeter, and after the sample is fused at 300° C. for 5 minutes, the sample is rapidly cooled in nitrogen liquid. The rapidly cooled sample is heated at a rate of 10° C./min to find the glass transition temperature Tg. The heating is continued and the cold crystallization temperature Tcc is determined as a temperature of the crystallization exothermic peak temperature from the glass state. The heating is still continued and the heat of fusion is determined as the peak temperature of fusion. The difference (Tcc–Tg) between the cold crystallization temperature Tcc and the glass transition temperature Tg is defined as the crystallization parameter ΔTcg.

(6) Molecular orientation at surface (refractive index)

Total reflection Raman crystallization index at surface:

The measurement is carried out by using a light source of sodium D ray (wave length: 589nm) and using an Abbe refractometer. Methylene iodide is used as the mount liquid, and the measurement is carried out under the conditions of a temperature of 25° C. and a humidity of 65%RH. When the refractive indexes in the longitudinal, transverse and thickness directions are represented by N1, N2 and N3, respectively, the biaxial orientation of the polymer can be represented by the condition that the absolute value of (N1–N2) is not more than 0.07 and N3/ {(N1+N2} is not more than 0.95. The refractive index may be measured by laser type refractometer. Further, if it is difficult to determine by the above method, total reflection laser Raman method can be employed. In the total reflection laser Raman method, the total reflection Raman spectrum is measured by Ramanor U-1000 Raman system produced by Jobin-Yvon Corporation, for example, in the measurement of polyethylene terephthalate, the fact, that the polarimetry ratio of the band intensity ratio of 1615 cm$^{-1}$ (skeletal vibration of benzene ring) and 1730 cm$^{-1}$ (stretching vibration of carbonyl group) corresponds to the molecular orientation, can be utilized.

(Where, the polarimetry ratio is, for example, ratio of YY/XX. YY: the polarization direction of the laser is set to Y and Raman ray parallel to the Y is detected. XX: the polarization direction of the laser is set to X and Raman ray parallel to the X is detected.) The biaxial orientation of the polymer can be determined by changing the parameter obtained from the Raman method to the refractive indexes in the longitudinal and transverse directions, and calculating the absolute values thereof and the difference therebetween. Further, the half value width of 1730 cm$^{-1}$ which represents stretching vibration of carbonyl group is defined as the total reflection Raman crystallization index at surface. In such a measurement, the measuring conditions are as follows.

① Light source: argon ion laser (5,145 Å)
② Setting of sample:
The film surface is pressed onto a total reflection prism, and the incident angle of laser into the prism (angle relative to the thickness direction of the film) is set to 60 degrees.
③ Detector:
PM: RCA31034/Photon Counting System (Hamamatsu C1230)
(supply: 1600V)
④ Measuring conditions:
Slit: 1000 μm
Laser: 100mW
Gate time: 1.0sec
Scan speed: 12 cm$^{-1}$/min
Sample interval : 0.2cm$^{-1}$
Repeat time: 6

(7) Diameter, Number and Height of protrusions on film surface

The height data of the protrusions measured with a two beam and two detector type scanning electron microscope (ESM-3200; produced by Elionics Corporation) and a cross section measuring apparatus (PMS-1; produced by Elionics Corporation) by scanning the surface of the film setting the planar portion of the surface as the base (height 0) is transferred to an image processor (IBAS-2000; produced by Karlzuis Corporation), and an image of the protrusions on the film surface is reconstructed on the display of the image processor. Then, the circle equivalent diameter is determined from the area data of the individual particle obtained by processing the portion of the protrusion in a binary condition in the reconstructed image, this circle equivalent diameter is defined as the diameter of the particle and the number of the particles with a diameter of 0.7 μm to 2.6 μm is counted. Further, the highest value among each height of the protrusion portions processed in a binary condition is defined as the height of the protrusion, and this determination is repeated on the respective protrusions. The determination is repeated 500 times changing measuring portions, the total number of the measured protrusions is counted and the number calculated as a number per 1mm$^2$ is defined as the number of the protrusions on the film surface. The average value of the heights of protrusions measured is defined as the mean height of protrusions. The magnification of the scanning electron microscope is selected from the range of 1,000 to 10,000 times.

(8) Young's modulus

Young's modulus is measured at 25° C. and 65%RH using a tensile tester, based upon the method defined in JIS-Z-1702.

(9) Intrinsic viscosity [η] (unit is dl/g)

The intrinsic viscosity is calculated by the following equation from the viscosity of the solution measured at 25° C. which is made by dissolving a sample in o-chlorophenol.

$\eta_{sp}/C = [\eta] + K[\eta]^2 \bullet C$

Where, $\eta_{sp}$=(solution viscosity/solvent viscosity)-1, C represents the weight of the dissolved polymer per 100 ml of solvent, and K represents Huggins' constant (0.343). The solution viscosity and the solvent viscosity are measured by an Ostwald's viscometer.

(10) Winding property

The film is wound into a film roll with a width of 1,000 mm and a length of 18,000m (winding speed: 300 m/min), the end surfaces are determined in detail with respect to telescoping (shifting) and longitudinal wrinkles, and the result is determined as follows. If the amount of the shifting at the end surface of the film roll (shifting in the width direction) is less than 0.5 mm and no defect such as longitudinal wrinkles occurs even after the roll is placed for more than 24 hours as it is, it is determined to be "excellent". If the amount of the shifting at the end surface of the film roll is less than 0.5 mm and no longitudinal wrinkles occur immediately after winding and but weak longitudinal wrinkles are slightly recognized after the roll is placed for more than 24 hours as it is, it is determined to be "good". If the amount of the shifting at the end surface of the film roll is not less than 0.5 mm or if longitudinal wrinkles are slightly recognized immediately after winding, it is determined to be "not good". The rank of "excellent" is desired, but even the rank of "good" is sufficient for practical use.

(11) Dubbing resistance

A magnetic coating solution with the following composition is coated on the film by using a gravure roll and the coated magnetic layer is dried and magnetically oriented. After the coated film is calendered by a small-sized test calendering apparatus (steel roll/nylon roll; 5 stages) at a temperature of 70° C. and a line pressure of 200 kg/cm, the film is cured at a temperature of 70° C. for 48 hours. The film is slitted to a tape with a width of ½ inch to make a pancake. The tape taken from the pancake is incorporated into a VTR cassette by a length of 250m to make a VTR cassette tape. (Composition of magnetic coating solution)(All parts are by weight.) • Co-containing iron oxide: 100 parts • Vinyl chloride/vinyl acetate copolymer: 10 parts • Polyurethane elastomer: 10 parts • Polyisocyanate: 5 parts • Lecitin: 1 parts • Methylethylketone: 75 parts • Methylisobutylketone: 75 parts • Toluene: 75 parts • Carbon black: 2 parts • Lauric acid: 1.5 parts 100% chromatic signal generated by a television testing wave generator is recorded in the above tape using a domestic VTR, and chromatic S/N is determined from the regenerated signal using a color video noise measuring apparatus and the obtained data is referred to as "A". On the other hand, the same signal is recorded on the pancake of a master tape, the recorded signal is dubbed to the same sample tape (non-recorded)

as that for the measurement of "A" using a video soft high-speed print system (sprinter) of magnetic field transfer type, and the chromatic S/N of the signal-transferred tape is measured in the same manner as that in the measurement of "A" and the obtained data is referred to as "B". If the reduction of the chromatic S/N in this dubbing (A–B) is less than 3dB, it is determined to be "excellent". If the reduction of the chromatic S/N is in the range of not less than 3dB and less than 5dB, it is determined to be "good", and if the reduction of the chromatic S/N is not less than 5dB, it is determined to be "not good". The rank "excellent" is desirable, but even the rank "good" is sufficient for practical use.

EXAMPLES AND COMPARATIVE EXAMPLES

Preferred examples will be hereinafter explained together with comparative examples.

Examples 1 and 2 (Table 1)

Firstly, the thermoplastic resin A was prepared. Ethylene glycol slurry containing silica particles originating from colloidal silica and having diameters different from each other as particles P and Q were prepared. After the ethylene glycol slurry was heat treated at a temperature of 190° C. for two hours, the ethylene glycol slurry was subjected to the transesterification with terephthalic acid dimethyl, and was polymerized to prepare polyethylene terephthalate pellets containing the particles at a predetermined content. The pellets were used as the thermoplastic resin A. On the other hand, polyethylene terephthalate pellets which did not contain particles were prepared, and were used as the thermoplastic resin B.

These pellets were dried under a reducing pressure condition (3 Torr) at a temperature of 180° C. for three hours, respectively. The thermoplastic resin A was supplied to an extruder No. 1 and molten at a temperature of 290° C. The thermoplastic resin B was supplied to an extruder No. 2 and molten at a temperature of 280° C. The molten polymers were laminated in a feed block, the laminated polymer was delivered out from a die having a slit in a form of a sheet, the delivered sheet was cast onto a casting drum having a surface temperature of 25° C. and cooled and solidified thereon applying an electrostatic charging method to make a non-stretched film with a two layer lamination structure. The thickness of the layer A composed of the thermoplastic resin A and the ratio t/d were controlled by controlling the outputs of the respective extruders. The non-stretched film was stretched in the longitudinal direction at a temperature of 85° C. and a draw ratio of 3.6 times. This longitudinal stretching was divided into four stages and the stretchings at the respective stages were carried out between respective pairs of rollers. The uniaxially stretched film obtained was stretched in the transverse direction using a stenter at a stretching speed of 2,000%min, a temperature of 95° C. and a draw ratio of 4.0 times, and the film was then heat treated at a temperature of 210° C. for five seconds to make a biaxially oriented laminated film having a total thickness of 10 μm. The resulted data of these films are shown in Table 1. As shown in Table 1, when the parameters are within the ranges specified by the present invention, films having good properties can be obtained.

Example 3 (Table 1)

Calcium carbonate particles were used as the particles P, and colloidal silica particles were used as the particles Q. Other conditions were the same as those in Example 1. The resulted data of the obtained biaxially oriented laminated film are shown in Table 1.

Examples 4 and 5 (Table 1)

The thermoplastic resin A was prepared using colloidal silica particles having a predetermined mean diameter as the particles P and crosslinked polydivinylbenzene particles having a predetermined mean diameter as the particles Q. Where, as the method for adding the crosslinked polydivinylbenzene particles, a method for supplying pellets containing colloidal silica particles prepared in a manner similar to that in Example 1 to a vent type twin-screw extruder, adding crosslinked polydivinylbenzene particles dispersed in water in a state of a slurry and blending the crosslinked polydivinylbenzene particles into the resin while discharging the water component out of the vent system was employed. Using the thermoplastic resin A thus prepared, a biaxially oriented laminated film was made in a manner similar to that in Example 1. The resulted data of the obtained biaxially oriented laminated film are shown in Table 1.

Example 6 (Table 1)

Calcium carbonate particles were used as the particles P, and crosslinked polydivinylbenzene particles were used as the particles Q. Other conditions were the same as those in Example 1. The resulted data of the obtained biaxially oriented laminated film are shown in Table 1.

Examples 7 and 8 (Table 1)

Colloidal silica particles were used as the particles P, and crosslinked polystyrene particles were used as the particles Q. Other conditions were the same as those in Example 1. The resulted data of the obtained biaxially oriented laminated film are shown in Table 1.

Examples 9 and 10 (Table 1)

Crosslinked polydivinylbenzene particles particles having diameters different from each other were used as the particles P and Q. Other conditions were the same as those in Example 1. The resulted data of the obtained biaxially oriented laminated film are shown in Table 1.

TABLE 1

| | Thermoplastic resin layer A | | | | | | | | | | |
|---|---|---|---|---|---|---|---|---|---|---|---|
| | Particle P | | Particle Q | | | | | | Number of protrusions with diameter of 0.7–2.6 μm (number/mm$^2$) | Total number of protrusions (10$^4$/mm$^2$) | | |
| | Kind of particle | Diameter of particle (μm) | Kind of particle | Diameter of particle (μm) | L/S | Pw/Qw | Mean diameter of particles | t/d | | | Winding property | Dubbing resistance |
| Example 1 | silica | 0.3 | silica | 0.6 | 1/170 | 30 (3%/0.1%) | 0.32 | 0.7 | 1500 | 25 | excellent | excel- |

TABLE 1-continued

| | Particle P | | Particle Q | | | | | | Number of protrusions with diameter of 0.7–2.6 μm (number/mm$^2$) | Total number of protrusions (10$^4$/mm$^2$) | Winding property | Dubbing resistance |
|---|---|---|---|---|---|---|---|---|---|---|---|---|
| | Kind of particle | Diameter of particle (μm) | Kind of particle | Diameter of particle (μm) | L/S | Pw/Qw | Mean diameter of particles | t/d | | | | |
| Example 2 | silica | 0.3 | silica | 0.8 | 1/450 | 40 (6%/0.15%) | 0.34 | 0.7 | 1000 | 45 | excellent | good |
| Example 3 | calcium carbonate | 0.3 | silica | 0.6 | 1/240 | 40 (5%/0.12%) | 0.31 | 0.9 | 2500 | 60 | excellent | good |
| Example 4 | silica | 0.3 | crosslinked polydivinylbenzene | 0.6 | 1/205 | 30 (5.5%/0.18%) | 0.31 | 0.7 | 2000 | 41 | excellent | excellent |
| Example 5 | silica | 0.2 | crosslinked polydivinylbenzene | 0.8 | 1/1500 | 160 (10%/0.06%) | 0.21 | 0.9 | 600 | 90 | excellent | excellent |
| Example 6 | calcium carbonate | 0.4 | crosslinked polydivinylbenzene | 1.2 | 1/60 | 15 (2%/0.13%) | 0.42 | 1.0 | 3500 | 20 | excellent | good |
| Example 7 | silica | 0.3 | crosslinked polystyrene | 0.8 | 1/50 | 6 (1%/0.17%) | 0.31 | 0.5 | 1000 | 5 | good | excellent |
| Example 8 | silica | 0.1 | crosslinked polystyrene | 0.5 | 1/100 | 10 (1%/0.1%) | 0.13 | 2.7 | 7300 | 75 | excellent | excellent |
| Example 9 | crosslinked polydivinylbenzene | 0.3 | crosslinked polydivinylbenzene | 0.8 | 1/110 | 15 (1.5%/0.1%) | 0.31 | 0.7 | 2200 | 25 | excellent | excellent |
| Example 10 | crosslinked polydivinylbenzene | 0.3 | crosslinked polydivinylbenzene | 1.0 | 1/200 | 20 (2.0%/0.1%) | 0.35 | 1.2 | 3000 | 60 | excellent | excellent |

Comparative Example 1 (Table 2)

Colloidal silica particles particles having diameters different from each other were used as the particles P and Q. Other conditions were the same as those in Example 1. The resulted data of the obtained biaxially oriented laminated film are shown in Table 2. Where, if the content of the particles Q was too much, the winding property and the dubbing resistance were both "not good".

Comparative Examples 2 and 3 (Table 2)

Colloidal silica particles were used as the particles P, and crosslinked polydivinylbenzene particles were used as the particles Q. Other conditions were the same as those in Example 1. The resulted data of the obtained biaxially oriented laminated film are shown in Table 2. Since t/d was out of the range according to the present invention, a film satisfying both the winding property and the dubbing resistance could not be obtained.

Comparative Example 4 (Table 2)

Colloidal silica particles were used as the particles P, and crosslinked polystyrene particles were used as the particles Q. Other conditions were the same as those in Example 1. The resulted data of the obtained biaxially oriented laminated film are shown in Table 2. Since the number of the protrusions formed by the large-diameter particles was too small, the winding property was not good.

Comparative Example 5 (Table 2)

Calcium carbonate particles were used as the particles P, and crosslinked polydivinylbenzene polystyrene particles were used as the particles Q. Other conditions were the same as those in Example 1. The resulted data of the obtained biaxially oriented laminated film are shown in Table 2. Since the number of protrusions formed by large-diameter particles was too large, the winding property and the dubbing resistance were both "not good".

Comparative Example 6 (Table 2)

Colloidal silica particles were used as the particles P, and crosslinked polystyrene particles were used as the particles Q. Other conditions were the same as those in Example 1. The resulted data of the obtained biaxially oriented laminated film are shown in Table 2. Since the number of the protrusions formed by the large-diameter particles was too small, the winding property was not good.

Comparative Example 7 (Table 2)

Calcium carbonate particles were used as the particles P, and crosslinked polydivinylbenzene polystyrene particles were used as the particles Q. Other conditions were the same as those in Example 1. The resulted data of the obtained biaxially oriented laminated film are shown in Table 2. Since the content ratio Pw/Qw of the respective particles was out of the range according to the present invention, the winding property and the dubbing resistance were both "not good".

contained in said thermoplastic resin A is in the range of 0.1 to 5, the number of protrusions having a diameter of not less than 0.7 μm and not more than 2.6 μm among protrusions existing on the surface of said layer A is in the range of 100/mm$^2$ to 10,000/mm$^2$ and the ratio L/S of the number S of protrusions having a diameter of not less than 0.2 μm and less than 0.7 μm to the number L of protrusions having a diameter of not less than 0.7 μm and not more than 2.6 μm is in the range of 1/50 to 1/10,000, and the total reflection Raman crystallization index of the surface of layer A is not more than 20 cm$^{-1}$.

2. The biaxially oriented thermoplastic resin film according to claim 1, wherein the total number of protrusions existing on the surface of said layer A is in the

TABLE 2

| | Particle P | | Particle Q | | | | | | Number of protrusions with diameter of 0.7–2.6 μm (number/mm$^2$) | Total number of protrusions (10$^4$/mm$^2$) | Winding property | Dubbing resistance |
|---|---|---|---|---|---|---|---|---|---|---|---|---|
| | Kind of particle | Diameter of particle (μm) | Kind of particle | Diameter of particle (μm) | L/S | Pw/Qw | Mean diameter of particles | t/d | | | | |
| Comparative Example 1 | silica | 0.3 | silica | 0.8 | 1/15 | 2.5 (6%/2.9%) | 0.55 | 0.4 | 19000 | 32 | not good | not good |
| Comparative Example 2 | silica | 0.2 | cross-linked polydi-vinyl-benzene | 0.8 | 1/1500 | 45 (4%/0.09%) | 0.21 | 0.07 | 60 | 9 | not good | not good |
| Comparative Example 3 | silica | 0.4 | cross-linked polydi-vinyl-benzene | 0.5 | 1/50 | 120 (0.5%/0.004%) | 0.41 | 10 | 9600 | 48 | good | not good |
| Comparative Example 4 | silica | 0.3 | cross-linked poly-styrene | 0.8 | 1/11000 | — | 0.3 | 1.3 | 80 | 90 | not good | good |
| Comparative Example 5 | calcium carbonate | 0.4 | cross-linked polydi-vinyl-benzene | 0.6 | 1/40 | — | 0.48 | 0.8 | 12000 | 50 | not good | not good |
| Comparative Example 6 | silica | 0.3 | cross-linked poly-styrene | 0.8 | — | 300 (3%/0.01%) | 0.3 | 0.3 | 80 | 11 | not good | good |
| Comparative Example 7 | calcium carbonate | 0.4 | cross-linked polydi-vinyl-benzene | 0.6 | — | 450 (10%/0.02%) | 0.48 | 0.7 | 150 | 90 | not good | not good |

Although several preferred embodiments and examples of the present invention have been described herein in detail, it will be appreciated by those skilled in the art that various modifications and alterations can be made to these embodiments and examples without materially departing from the novel teachings and advantages of this invention. Accordingly, it is to be understood that all such modifications and alterations are included within the scope of the invention as defined by the following claims.

What is claimed is:

1. A biaxially oriented thermoplastic resin film formed by laminating a layer A composed of a thermoplastic resin A containing particles on at least one surface of a layer B composed of a thermoplastic resin B, characterized in that the ratio t/d of the thickness "t" of said layer A to the mean diameter "d" of the particles range of 100,000/mm$^2$ to 2,000,000/mm$^2$.

3. The biaxially oriented thermoplastic resin film according to claim 2, wherein the total number of protrusions existing on the surface of said layer A is in the range of 150,000/mm$^2$ to 900,000/mm$^2$.

4. The biaxially oriented thermoplastic resin film according to claim 1, wherein said thermoplastic resin A contains at least two kinds of particles having mean diameters different from each other.

5. The biaxially oriented thermoplastic resin film according to claim 4, wherein particles having the largest mean diameter among said at least two kinds of particles contained in said thermoplastic resin A are organic particles.

6. The biaxially oriented thermoplastic resin film according to claim 5, wherein said organic particles are crosslinked organic particles.

7. The biaxially oriented thermoplastic resin film according to claim 6, wherein said crosslinked organic particles are crosslinked polydivinylbenzene particles.

8. A biaxially oriented thermoplastic resin film formed by laminating a layer A composed of a thermoplastic resin A containing at least two kinds of particles having mean diameters different from each other on at least one surface of a layer B composed of a thermoplastic resin B, characterized in that the ratio t/d of the thickness "t" of said layer A to the mean diameter "d" of the particles contained in said thermoplastic resin A is in the range of 0.1 to 5, the number of protrusions having a diameter of not less than 0.7 μm and not more than 2.6 μm among protrusions existing on the surface of said layer A is in the range of 100/mm$^2$ to 10,000/mm$^2$ and the ratio Pw/Qw of the weight content Pw of particles having the smallest mean diameter among said at least two kinds of particles contained in said thermoplastic resin A to the weight content Qw of particles having the largest mean diameter among said at least two kinds of particles contained in said thermoplastic resin A is in the range of 4 to 400, and the total reflection Raman crystallization index of the surface of layer A is not more than 20 cm$^{-1}$.

9. The biaxially oriented thermoplastic resin film according to claim 8, wherein the total number of protrusions existing on the surface of said layer A is in the range of 100,000/mm$^2$ to 2,000,000/mm$^2$.

10. The biaxially oriented thermoplastic resin film according to claim 9, wherein the total number of protrusions existing on the surface of said layer A is in the range of 150,000/mm$^2$ to 900,000/mm$^2$.

11. The biaxially oriented thermoplastic resin film according to claim 8, wherein said particles having the largest mean diameter among said at least two kinds of particles contained in said thermoplastic resin A are organic particles.

12. The biaxially oriented thermoplastic resin film according to claim 11, wherein said organic particles are crosslinked organic particles.

13. The biaxially oriented thermoplastic resin film according to claim 12, wherein said crosslinked organic particles are crosslinked polydivinylbenzene particles.

* * * * *

UNITED STATES PATENT AND TRADEMARK OFFICE
CERTIFICATE OF CORRECTION

PATENT NO. : 5,401,559
DATED : March 28, 1995
INVENTOR(S) : Katsuya Okamoto et al It is certified that error appears in the above-indentified patent and that said Letters Patent is hereby corrected as shown below:

Column 10, line 59, please change "N3/{(N1+N2}" to --N3/{(N1+N2)/2}--.

Signed and Sealed this

Sixth Day of June, 1995

*Attest:*

*Attesting Officer*

BRUCE LEHMAN

*Commissioner of Patents and Trademarks*